United States Patent [19]
Dietz et al.

[11] 3,837,828
[45] Sept. 24, 1974

[54] METHOD OF MELTING LASER GLASS IN A NOBLE METAL CONTAINER IN A CONTROLLED REDUCING ATMOSPHERE

[75] Inventors: Earl D. Dietz; Paul R. Wengert, both of Toledo, Ohio

[73] Assignee: Owens-Illinois, Inc., Toledo, Ohio

[22] Filed: Sept. 1, 1971

[21] Appl. No.: 177,090

[52] U.S. Cl. ............ 65/32, 106/52, 252/301.4 F
[51] Int. Cl. ............................................. C03b 5/00
[58] Field of Search ............... 252/301.4 F; 106/52; 65/32

[56] References Cited
UNITED STATES PATENTS

| | | | |
|---|---|---|---|
| 3,233,993 | 2/1966 | Weidel | 65/32 X |
| 3,527,711 | 9/1970 | Barber et al. | 65/32 X |
| 3,656,924 | 4/1972 | Chapman et al. | 65/32 |

*Primary Examiner*—Arthur D. Kellogg
*Attorney, Agent, or Firm*—R. D. Heberling; E. J. Holler

[57] ABSTRACT

This invention provides methods for melting glass laser compositions to provide glass laser rods with a minimum of noble metal inclusions and a minimum of dissolved noble metal content. The process comprises melting the laser glass in a noble metal container that is preferably platinum in a controlled reducing atmosphere in which the partial pressure of oxygen is between about $10^{-2}$ and $10^{-50}$ atmospheres.

20 Claims, No Drawings

METHOD OF MELTING LASER GLASS IN A NOBLE METAL CONTAINER IN A CONTROLLED REDUCING ATMOSPHERE

THE INVENTION

The invention here described was made in accordance with a contract with the United States Government.

The present invention is directed to methods of melting glass to provide high quality glass laser articles. The melting is accomplished in a noble metal container without any attack on the noble metal.

The invention more particularly relates to a method of melting glass laser compositions, preferably lithia-calcia-alumina silicate glasses, to provide high quality glass laser rods by melting the glass in a noble metal container containing at least about 50 percent by weight of a noble metal such as platinum in an atmosphere that is reducing and that is controlled by maintaining the partial pressure of oxygen at about $10^{-2}$ and $10^{-50}$ atmospheres. The controlling of the reduced atmosphere reduces the amount of noble metal inclusions in the glass laser rod, reduces the amount of dissolved noble metal in the resultant rod, and eliminates attack of the noble metal container.

It is highly desirous to melt the laser glass compositions to provide very high quality glass laser rods in a noble metal container without any undesirable amount of noble metal inclusions such as platinum inclusions and a minimum of dissolved noble metal content in the rod.

It is an object of the present invention to provide a method of melting glass laser compositions with a minimum of noble metal inclusions and a minimum of dissolved noble metal content in which the process comprises melting the laser glass composition in a noble metal container in a controlled reducing atmosphere in which the partial pressure of oxygen is between about $10^{-2}$ and $10^{-50}$ atmospheres.

It is an object of the present invention to melt glass laser compositions preferably those of a lithium silicate glass system with a minimum of platinum inclusions and a minimum of dissolved platinum content in the rod, the process comprising melting the glass in a platinum metal container in a controlled reducing atmosphere in which the partial pressure of oxygen preferably is between about $10^{-4}$ and $10^{-15}$ atmospheres to produce the aforementioned outstanding laser rod or disc with a minimum of platinum inclusions and a minimum of dissolved platinum content.

It is an object of the present invention to provide a method of melting a lithium oxide-calcium oxide-aluminum oxide silicate glass composition to provide a glass rod with a minimum of platinum inclusions and dissolved platinum, the process comprising melting the laser glass composition in a controlled reducing atmosphere using a buffered gas mixture such as a mixture of $CO_2$ and $CO$ in which the partial pressure of oxygen is between about $10^{-8}$ and $10^{-12}$ atmospheres at 2,600°F. to produce the high quality glass rod and at the same time avoid attack on the platinum container.

These and other objects will be apparent from the specification that follows and the appended claims.

The present invention provides a method of melting glass laser compositions with a minimum of noble metal inclusions and a minimum of dissolved noble metal content, the process comprising melting the laser glass composition in a noble metal container in a controlled reducing atmosphere in which the partial pressure of oxygen is between about $10^{-2}$ and $10^{-50}$ atmospheres to thereby reduce the amount of noble metal inclusions and dissolved noble metal in the resultant glass laser material and eliminate attack of the noble metal container.

The noble metal is preferably platinum or at least a platinum alloy containing about 80–90 percent by weight of platinum. Other noble metals that can be used are palladium, rhodium, iridium, osmium, gold, silver, Re and alloys thereof. As previously indicated, the laser glass compositions are melted in a noble metal container in an atmosphere that is a reducing atmosphere and one that is maintained by controlling the partial pressure of oxygen above the amount at which the oxides of an element such as a glass forming element $SiO_2$, in the glass is reduced through the element such as Si, which element Si reacts in turn with the noble metal to form a noble metal-Si alloy that is deleterious to the container. The free energy of the following chemical reaction is always greater than zero and the partial pressure of oxygen is effective such that the oxide does not reduce according to the following equation: $MO_x$ (in glass solution) $\rightarrow$ M (in noble metal solution, failed part) + $X/2\ O_2$ (gas at $P_{O_2}$) where M is an oxide forming element of a glass batch ingredient used to make high quality glass articles, O is oxygen, X is the fraction or integer describing the oxide stoichiometry, and $P_{O_2}$ is the partial pressure of oxygen, the change in free energy being expressed by the following equation:

$$\Delta F = - \Delta F°_f (MO_x) + RT \log_e [(P_{O_2})^{x/2} (a_M)/(a_{MO_x})]$$

where $\Delta F$ is the change in free energy, $\Delta F°_f (MO_x)$ is the standard state Gibbs free energy of formation of the oxide, $MO_x$, at a constant temperature; $a_{MO_x}$ is the thermodynamic activity of the oxide, $MO_x$, in glass solution; $a_M$ is the thermodynamic activity of the element in Pt solution at the point of Pt part failure; R is the gas constant equal to about 1.98717 cal/mole degree; and T is temperature in degrees Kelvin.

It is highly desirable to melt laser glass and form high quality laser glass articles in a platinum container with no attack of the container. In accordance with the present invention, this is accomplished by controlling the partial pressure of oxygen above a minimum amount so that metal oxides in the glass, such as $SiO_2$, $Na_2O$ and $Li_2O$, are not reduced to the metal which in turn would react with platinum to form a metal platinum alloy.

It is preferred that the laser glasses of the present invention be lithium silicate glasses although other silicate glasses are useful in making high quality articles according to the present invention. Generally M is silicon in the preceding equation describing the change in free energy.

It is preferred that the laser glass composition be a lithium oxide-calcium oxide-aluminum oxide silicate composition containing at least about 8 mole percent lithia. In this case, excellent high quality articles are made by melting the composition and controlling the partial pressure of oxygen so that it is equivalent to one that is greater than about $10^{-13}$ atmospheres at 2,600°F. to thereby eliminate attack of the platinum container. It is preferred that the above glass have the following ingredients in approximate mole percent:

| INGREDIENTS | PERCENT |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 |

Suitable glass compositions that can be formed into high quality articles without attack on the platinum or noble metal container in accordance with the present invention by controlling the partial pressure of oxygen are $K_2O$—$Na_2O$—BaO—$SiO_2$ glasses, $Na_2O$—BaO—$SiO_2$ glasses, and other alkali oxide-alkaline earth oxide silicate glasses with or without additions of $Al_2O_3$ and $Sb_2O_3$. Specific glass compositions are shown below with their approximate mole fractions.

TABLE I

GLASS COMPOSITIONS

| Glass No. | Component | Mole Fraction |
|---|---|---|
| 1 | $SiO_2$ | 0.785 |
|   | BaO | 0.014 |
|   | $Na_2O$ | 0.080 |
|   | $K_2O$ | 0.112 |
|   | $Nd_2O_3$ | 0.010 |
| 2 | $SiO_2$ | 0.719 |
|   | $Al_2O_3$ | 0.014 |
|   | $Sb_2O_3$ | 0.002 |
|   | BaO | 0.014 |
|   | ZnO | 0.017 |
|   | $Li_2O$ | 0.023 |
|   | $Na_2O$ | 0.068 |
|   | $K_2O$ | 0.113 |
|   | $Nd_2O_3$ | 0.010 |
| 3 | $SiO_2$ | 0.791 |
|   | $TiO_2$ | 0.004 |
|   | $Sb_2O_3$ | 0.005 |
|   | BaO | 0.018 |
|   | PbO | 0.006 |
|   | $Na_2O$ | 0.045 |
|   | $K_2O$ | 0.126 |
|   | $Nd_2O_3$ | 0.006 |
| 4 | $SiO_2$ | 0.480 |
|   | $B_2O_3$ | 0.174 |
|   | $Al_2O_3$ | 0.073 |
|   | $As_2O_3$ | 0.073 |
|   | BaO | 0.255 |
|   | $Nd_2O_3$ | 0.013 |
| 5 | $SiO_2$ | 0.593 |
|   | $Al_2O_3$ | 0.025 |
|   | $K_2O$ | $2.12 \times 10^{-7}$ |
|   | $CeO_2$ | $1.6 \times 10^{-3}$ |
|   | $Fe_2O_3$ | $9.4 \times 10^{-8}$ |
|   | $Na_2O$ | $9.42 \times 10^{-7}$ |
|   | $Li_2O$ | 0.275 |
|   | $Nd_2O_3$ | 0.005 |
|   | CaO | 0.100 |
| 6 | $SiO_2$ | 0.762 |
|   | $Al_2O_3$ | 0.017 |
|   | $Sb_2O_3$ | 0.002 |
|   | BaO | 0.023 |
|   | ZnO | 0.017 |
|   | $Li_2O$ | 0.023 |
|   | $Na_2O$ | 0.077 |
|   | $K_2O$ | 0.080 |
|   | $Nd_2O_3$ | 0.010 |
| 7 | $SiO_2$ | 0.792 |
|   | $Al_2O_3$ | 0.010 |
|   | BaO | 0.022 |
|   | ZnO | 0.012 |
|   | $Li_2O$ | 0.022 |
|   | $Na_2O$ | 0.080 |
|   | $K_2O$ | 0.053 |
|   | $Nd_2O_3$ | 0.007 |

TABLE I-Continued

GLASS COMPOSITIONS

| Glass No. | Component | Mole Fraction |
|---|---|---|
| 8 | $SiO_2$ | 0.773 |
|   | $Sb_2O_3$ | 0.002 |
|   | BaO | 0.113 |
|   | $Na_2O$ | 0.100 |
|   | $K_2O$ | 0.013 |

Also suitable is the following glass composition given in approximate parts by weight:

| $SiO_2$ | 67.17 |
|---|---|
| CaO | 10.80 |
| $Na_2O$ | 15.93 |
| $K_2O$ | .19 |
| $Al_2O_3$ | .75 |
| $Sb_2O_3 + As_2O_3$ | .38 |
| $Nd_2O_3$ | 4.78 |
|  | 100.00 |

The term noble metal "failure" or platinum "failure" occurs in the case of platinum (1) if a liquid phase were to be formed, (2) if an intermetallic alloy compound is formed or (3) there is a large increase in the platinum lattice parameter ($d$ spacing) that occurs on the addition of a contaminating metal element. Hence, the point of failure of platinum parts in contact with the glass during the melting operation can be calculated using thermodynamic data such as free energy data, the activities of oxides in the glass, and the activities of the corresponding metals in platinum. The lowest oxygen partial pressure one can use for controlling the melting of the lithium oxide-calcium oxide-aluminum oxide silicate glass composition is generally about $10^{-13}$ at 2,600°F. It is desired, of course, to reduce the partial pressure of oxygen as low as possible in order to minimize the partial pressure of any $PtO_2$ (gas) above the melt and the activity of the corresponding platinum oxide complex of the glass. Hence, in accordance with the equations previously set forth, platinum failure can be expected to occur somewhere below $10^{-7}$ atmospheres at 2,600°F. and usually not until $10^{-13}$ atmospheres at 2,600°F. (1,700°K.). Generally in the above-described lithium oxide-calcium oxide-aluminum oxide silicate glass platinum metal failure does not occur until a lower $P_{O_2}$ is reached within the glass and hence the critical element is the $SiO_2$ reduction reaction to Si. The following table gives partial pressures of oxygen below which there will generally be platinum failure caused by the formation of the platinum-metal element alloy.

| ELEMENT | $P_{O_2}$ at 2600°F. |
|---|---|
| Si | Generally below about $10^{-11}$ to as low as $10^{-13}$ atm. |
| Li | $10^{-14}$ atm. |
| Ca | $10^{-21}$ atm. |

It can be seen that in the case of the lithium oxide-calcium oxide-aluminum oxide silicate, the silica reduction is controlling the lower limit of the $P_{O_2}$. If silica were not present, other oxide constituents would control the lower limit of $P_{O_2}$.

In accordance with the present invention, the thermodynamic calculations for the partial pressure of oxygen provided for platinum metal failure in contact with an $LiO-CaO-SiO_2-Nd_2O_3$ glass can be written. It can be seen that platinum failure can be expressed from a chemical point of view by reaction 1. Silicon is used as an example.

Si ($X_{Si}^{Pt}$ in failed Pt) + $O_2$ (gas, $P_{O_2}$) → $SiO_2$ ($X_{SiO_2}^{glass}$ in glass sol'n); T = 1,700°K. Reaction = $R_x$ (1)

When these three phases are in equilibrium at the appropriate mole fractions and partial pressure, the Pt will have "failed" by definition. Equilibrium occurs when the Gibb's free energy for Reaction (1) ($\Delta F_\textcircled{1}$) is zero.

$$\Delta F = \Delta F° + RT \ln [a_{SiO_2}^{glass}/(a_{S_1}^{Pt}))P_{O_2})] = 0$$

(II-1)

The $P_{O_2}$ required for $\Delta F \leq 0$ is desired. $\Delta F°_\textcircled{1} = \Delta F°_f$ ($SiO_2$) = −145,600 cal/mole at 1,700°K (2,600°F.).

For glass composition No. 5, $X_{SiO_2}^{glass} = 0.593$ and the $a_{SiO_2}^{glass}$ has been experimentally determined; because "failure" was not observed above $P_{O_2} = 10^{-10}$ atm., let $a_{SiO_2}^{glass} = 0.15$ for the calculation. The mole fractions of the glass constituents are not being changed in order to avoid Pt failure so these mole fractions and corresponding activities will remain constant for the calculations.

The $a_{MeO_x}^{glass}$'s are available at 1,700°K. for $SiO_2$, $Li_2O$ and $CaO$. Insufficient data is available to estimate $a_{Al_2O_3}^{glass}$.

There are two ways of estimating the $a_{Si}^{Pt}$ at failure, the last parameter necessary in order to calculate $P_{O_2}$ required for failure. The $a_{Si}^{Pt}$ can be estimated knowing the $\Delta F°_f$ ($SiPt_3$), $a_{Si}^{Pd}$, $a_{Si}^{Re}$, or $a_{Si}^{Ni}$. Based upon this empirical data, the $a_{Si}^{Pt}$ at failure has been estimated to be $10^{-5}$ at 1,533°K. These data could be temperature corrected from 1,533° to 1,700°K. by assuming that T log $a_{Me}^{Pt}$ is not a function of temperature. This can be demonstrated by considering the reaction:

Me (pure) → Me (in Pt. sol'n)

Rx (2)

For Rx (2), $\Delta F_\textcircled{2} = \Delta H_\textcircled{2} - T\Delta S_2$. $\Delta S_\textcircled{2} \approx 0$ because the degree of disorder is similar between solids and between solids and liquids; therefore, $\Delta F_\textcircled{2}$ is not a strong F (T). Also note:

Therefore, T log $a_{Al_2O_3}^{glass}$ is not a strong $f(t)$. Using this relation, the $a_{Me}^{Pt}$ at 1,700°K. can be calculated knowing $a_{Al}^{Pt}$ at 1,533°K. Consider $a_{Si}^{Pt}$ as an example:

(1,533°K) log [$a_{Si}^{Pt}$ at 1,533°K] = (1,700°K) log [$a_{Si}^{Pt}$ at 1,700°K]

log [$a_{Si}^{Pt}$ at 1,700°K] = 1533/1700 ($10^{-5}$) = $0.9 \times 10^{-5}$ ≈ $10^{-5}$ Since the estimated value of the $a_{Me}^{Pt}$ at 1,533°K. is not accurate to more than one order of magnitude, the $a_{Me}^{Pt}$ at 1,533°K. $a_{Me}^{Pt}$ at 1,700°K.

Using the above values and in the previous equation, the $P_{O_2}$ required for failure is calculated:

−145,600 + (1.987)(2.303)(1,700°K) $\log_{10}$ [0.15/($10^{-5}$)($P_{O_2}$)] = 0

Therefore, $P_{O_2} \leq 10^{-13.0}$ atm. is order for failure to occur.

The same calculation is done for the other oxides and metals. The data used is presented in Table 2.

The other method of estimating the $a_{Me}^{Pt}$ at failure assumes that ≈1 at. percent of the metal (Me) can be dissolved in the Pt before failure would be expected. The $a_{Me}^{Pt}$ is related to the mole fraction ($X_{Me}^{Pt}$) by the relation $a_{Me}^{Pt} = \gamma_{Me}^{Pt} X_{Me}^{Pt}$ where $\gamma_{Me}^{Pt}$ is the activity coefficient as empirically determined. Table 3 lists the data used in the previous equation to calculate $P_{O_2}$ required for failure and the obtained $P_{O_2}$ values.

Table 2

CALCULATION OF $P_{O_2}$ REQUIRED FOR Pt FAILURE ASSUMING T = 1700°K = 2600°F

| Element (Me) | glass $a_{MeO_x}$ | $a_{Me}^{Pt}$ | $\Delta F°_f$ (MeO) (cal/mole) | $P_{O_2}$ Required for Pt Failure (atm.) |
|---|---|---|---|---|
| Si | 0.15 | $10^{-5}$ | −145,600 | $\leq 10^{-13.0}$ |
| Li | $6\times10^{-10}$ | $10^{-6}$ | −85,431 | $\leq 10^{-13.8}$ |
| Al | $1.29\times10^{-2}$ | $10^{-8}$ | −269,989 | $\leq 10^{-12.6}$ |
| Ca | 0.1 | $10^{-4}$ | −108,160 | $\leq 10^{-20.9}$ |

TABLE 3

CALCULATION OF $P_{O_2}$ REQUIRED FOR Pt FAILURE ASSUMING $X_{Me}^{Pt} = 0.01$ and $Y_{Me}^{Pt}$ ($X_{Me}^{Pt}$) = 0.01 = $Y_{Me}^{Pt}$

T = 1700°K = 2600°F.

| Element (Me) | $a_{MeO_x}$ | $X_{Me}^{Pt}$ | $Y_{Me}^{Pt}$ | $\Delta F°_f$(MeO$_x$) cal/mole | $P_{O_2}$ required for Pt Failure |
|---|---|---|---|---|---|
| Si | 0.15 | 0.01 | $9\times10^{-7}$ | −145,600 | $\leq 10^{-11.5}$ atm. |
| Li | $6\times10^{-10}$ | 0.01 | $5\times10^{-5}$ | −85,431 | $\leq 10^{-14.8}$ atm. |
| Ca | 0.1 | 0.01 | $1\times10^{-6}$ | −108,160 | $\leq 10^{-21.2}$ atm. |

It can be seen that outstanding high quality glass articles can be formed from glass metls by melting the glass in a noble metal container having a content of preferably at least 50 percent and more preferably at least 90 percent platinum, by providing an atmosphere with a buffered gas mixture that is a reducing mixture and controlling the partial pressure of oxygen therein so that the glass forming oxides or other oxides of the glass raw batch do not reduce to an element such as silicon, sodium, lithium, aluminum or calcium which in turn can attack the platinum or other noble metal in the container. The controlling of the partial pressure for the $Li_2O-CaO-Al_2O_3-SiO_2$ glass is at a value equivalent to that of about $10^{-13}$ atmospheres at 2,600°F.

The following table provides the method of selecting other partial pressures of oxygen at other melting temperatures other than 2,600°F. This table sets forth the minimum $\log_{10} P_{O_2}$ values for a silicate glass (preferably the $Li_2O$—$CaO$—$Al_2O_3$—$SiO_2$ glasses) at various temperatures from about 261° to 3,321°F. that can be used to provide laser articles without platinum or noble metal failure:

TABLE 4

| T °F. | T °C. | T °K. | $\log_{10} P_{O_2}$ |
|---|---|---|---|
| 261 | 127 | 400 | −85 |
| 441 | 227 | 500 | −68 |
| 801 | 427 | 700 | −44 |
| 981 | 527 | 800 | −38 |
| 1701 | 927 | 1200 | −22 |
| 1881 | 1027 | 1300 | −20 |
| 2061 | 1127 | 1400 | −18 |
| 2241 | 1227 | 1500 | −16 |
| 2421 | 1327 | 1600 | −14 |
| 2601 | 1427 | 1700 | −13 |
| 2781 | 1527 | 1800 | −12 |
| 2961 | 1627 | 1900 | −11 |
| 3141 | 1727 | 2000 | −10 |
| 3321 | 1827 | 2100 | −8.6 |

Hence, at about 2,600°F. the partial pressure of oxygen should be kept above about $10^{-13}$ atmospheres. At about 2,421°F., the controlling of the partial pressure of oxygen should be at a level above about $10^{-14}$ to prevent platinum failure. Hence, the critical value of $P_{O_2}$ of about $10^{-14}$ atmospheres at about 2,421°F. is equivalent to about $10^{-13}$ atmospheres at about 2,601° or 2,600°F.

In the present invention, a reducing atmosphere is defined as any atmosphere maintaining a $P_{O_2} \leqslant 10^{-3}$ atm.

When a silicate glass is melted generally a range of $P_{O_2}$ of about $10^{-8}$ to $10^{-13}$ atm. is preferred to provide a practical melting process. For some commercial applications, it is highly preferred that the $P_{O_2}$ be controlled at about $10^{-11}$ to $10^{-13}$ atm., generally the closer to the minimum about $10^{-13}$ atm., the greater the advantage.

In the present invention that provides outstanding glass laser articles such as rods and discs, the controlled reducing atmosphere generally should be one that is equivalent to about $10^{-2}$ to about $10^{-50}$ atmospheres at 2,600°F. although it is preferred that the partial pressure of oxygen be about $10^{-4}$ to $10^{-15}$ atmospheres. For best results in a practical process, the partial pressure is about $10^{-8}$ to $10^{-12}$ atmospheres at 2,600°F. to greatly reduce the amount of platinum inclusions in the resultant glass laser rod and avoid attack on the platinum container.

In one outstanding embodiment, partial pressure of the oxygen is about $10^{-10}$ atmospheres at 2,600°F. when using a lithia-calcia-alumina silicate glass laser composition comprising the following ingredients in approximate mole percentages:

| INGREDIENTS | PERCENT |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 | where the total amount of $Li_2O$ and CaO is not substantially higher than about 50 mole percent; when the $Li_2O$ is present at about 15 mole percent, the amount of CaO is at least about 10 mole percent; and when the CaO content is at about ½ mole percent, the amount of $Li_2O$ is at least about 24 mole percent.

Outstanding glass laser rods can be made using a glass laser composition comprising the following approximate composition in percent by weight:

| COMPONENT | WEIGHT PERCENT |
|---|---|
| $SiO_2$ | At least 45 up to 80 |
| $Al_2O_3$ | Greater than 4 up to 40 |
| $Li_2O$ | Greater than 5.5 up to 20 |
| $Nd_2O_3$ | At least about 1 up to 8 |

Particularly outstanding glass laser rods have been made from glass laser compositions comprising the following approximate weight percent:

| COMPONENT | WEIGHT PERCENT |
|---|---|
| $SiO_2$ | 77.16 |
| $Al_2O_3$ | 4.68 |
| $Li_2O$ | 15.07 |
| $Nd_2O_3$ | 3.09 |

As indicated above, glass laser compositions of U.S. Pat. Nos. 3,457,182 and 3,471,409 to Lee and Rapp provide outstanding laser rods and the disclosures of these patents are hereby incorporated by reference.

Excellent results, for instance, have been obtained using the following neodymium oxide doped glass having the following approximate composition:

| INGREDIENTS | MOLE PERCENT |
|---|---|
| $SiO_2$ | 60 |
| $Al_2O_3$ | 2.5 |
| $Li_2O$ | 27.5 |
| CaO | 10 |
| $Nd_2O_3$ | 0.5 |
| $CeO_2$ | 0.16 |

Other alkali metal oxide-alkaline earth oxide-lithia silicate glasses with or without relatively small amounts of $Al_2O_3$ are also suitable and these are disclosed in U.S. Pat. applications Ser. Nos. 831,257 filed June 6, 1969, now U.S. Pat. No. 3,640,891; and Ser. No. 831,256 filed June 6, 1969, now U.S. Pat. No. 3,640,890 which applications are incorporated by reference herein. Such suitable glass laser compositions comprise the following ingredients in mole percentages:

| INGREDIENTS | MOLE PERCENT |
|---|---|
| $SiO_2$ | 45 to 75 |
| $Li_2O$ | 15 to 35 |
| RO | ½ to 30 |
| $Nd_2O_3$ | 1/10 to 2 |
| $Al_2O_3$ | 0 to 8 | wherein RO is selected from the alkaline earth oxide group consisting of MgO, BeO, SrO, BaO, mixtures thereof, and mixtures of one or more of the foregoing with CaO, where the total amount of $Li_2O$ and RO is not substantially higher than about 50 mole percent; when the $Li_2O$ is present at about 15 mole percent, the amount of RO is at least about 10 mole percent; and when the RO content is at least about ½ mole percent, the amount of $Li_2O$ is at least about 24 mole percent, and when mixtures of CaO and another alkaline earth oxide are employed, said another alkaline earth oxide being present in an amount of at least about 0.1 mole percent.

Other suitable glass laser compositions comprise the following ingredients in mole percentages:

| INGREDIENTS | MOLE PERCENT |
|---|---|
| $SiO_2$ | 45 to 75 |
| $Li_2O$ | 18 to 35 |
| $R_2O$ | 0.5 to 10 |
| $Nd_2O_3$ | 0.1 to 2 |
| $Al_2O_3$ | 0 to 10 | wherein $R_2O$ is a member selected from the group consisting of $Na_2O$, $K_2O$, $Rb_2O$, $Cs_2O$ and mixtures thereof.

The preferred buffered gas mixture used for the controlled reducing conditions is a mixture of $CO_2$ and CO, preferably containing about 5 or 6 up to 9 or 10 percent CO. Other buffered gas mixtures can be used such as $CO_2/NH_3$, $CO_2/H_2$, $H_2O/H_2$, $H_2O/NH_3$, and other gas mixtures providing the partial pressure of oxygen is controlled as previously stated.

By melting glass laser rods in a platinum container under reducing conditions, excellent glass laser rods have been obtained by controlling the partial pressure of oxygen, such controlling of the partial pressure of oxygen being used successfully to reduce platinum inclusions, reduce the amount of dissolved platinum, and also avoid attack of the platinum container.

The present invention can be used in the apparatus and methods described in Chapman and LeSueur copending U.S. patent application Ser. No. 877,076 filed Nov. 17, 1969 now U.S. Pat. No. 3,656,924. The buffered gas mixture is used to produce the atmosphere over the glass melt and is used as the inert gas that does not attack or oxidize the platinum-lined container such as the furnace. This application is also incorporated by reference.

Laser rods can be produced by a double melting step in which the partial pressure of oxygen is controlled, say, between about $10^{-8}$ to $10^{-12}$ atmospheres in the first step. The second step is conducted by controlling the $P_{O_2}$ at about $10^{-4}$ or $10^{-6}$ atmospheres. Apparently the first step is effective in hindering the dissolution of Pt into the glass and the second step is effective in dissolving any platinum inclusions to reproducibly obtain high quality glass laser articles.

Various modifications of the invention may be made under the patent statutes without departing from the spirit of the invention.

What is claimed is:

1. In a method of melting a lithium oxide-calcium oxide-aluminum oxide silicate glass laser composition to provide a glass laser article with a minimum of platinum inclusions and dissolved platinum in which the glass composition contains at least 50 percent by weight of platinum, the improvement comprising the steps of:

melting the laser glass composition in a reducing atmosphere with a buffered gas mixture of the group consisting of $CO_2/NH_3$, $CO_2/H_2$, $H_2O/H_2$, $H_2O/NH_3$ and $CO_2/CO$; and maintaining the atmosphere above the molten glass composition with the gas mixture to provide a partial pressure of oxygen above a minimum level which corresponds to a range of about $10^{-8.6}$ to $10^{-38}$ atmospheres for a temperature range of about 981° to 3,321°F. for a silicate glass, the partial pressure of oxygen of $10^{-38}$ atmospheres being the minimum level for the low temperature of about 981°F. and the partial pressure of $10^{-8.6}$ being at the minimum level at the high temperature of about 3,321°F., the minimum levels of $P_{O_2}$ being determined at the temperature used to melt the glass according to the following equation:

$$\Delta F = \Delta F_f^\circ + RT \ln [A_{SiO_2}^{glass}/(A_{Si}^{Pt})(P_{O_2})] = 0$$

in which $\Delta F$ is the change in free energy; $\Delta F_f^\circ$ is the standard state Gibbs free energy of formation of $SiO_2$ which is 145,600 cal/mole at 2,600°F.; R is the universal gas constant equal to about 1.98717 cal/mole degree; T is the temperature at which the glass is melted in degrees Kelvin which is 1,700 at 2,600°F.; $A_{SiO_2}^{glass}$ is 0.15; $A_{Si}^{Pt}$ is $10^{-5}$; and $P_{O_2}$ is the partial pressure of oxygen.

2. A method as defined in claim 1 in which the laser glass composition comprises the following ingredients in approximate mole percentages:

| Ingredients | Percent |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 | where the total amount of $Li_2O$ and CaO is not substantially higher than about 50 mole percent; when the $Li_2O$ is present at about 15 mole percent, the amount of CaO is at least about 10 mole percent; and when the CaO content is at about ½ mole percent, the amount of $Li_2O$ is at least about 24 mole percent, the buffered gas mixture being selected from the group consisting of $CO_2/NH_3$, $CO_2/H_2$, $H_2O/H_2$, $H_2O/NH_3$, and $CO_2/CO$ in which the reducing gas is about 5 to 10 percent by volume of the mixture.

3. A method as defined in claim 1 in which the following ingredients are present in approximate mole percent:

| INGREDIENTS | PERCENT |
|---|---|
| $SiO_2$ | 48–65 |
| $Li_2O$ | 20–30 |
| CaO | 5–25 |
| $Nd_2O_3$ | 0.1–2 |
| $Al_2O_3$ | 0–8 |

4. A method as defined in claim 1 in which the buffered gas mixture comprises $CO_2$ and and CO, and the laser glass composition comprises the following ingredients in approximate mole percentages:

| Ingredients | Mole Percent |
|---|---|
| $SiO_2$ | 60 |
| $Al_2O_3$ | 2.5 |
| $Li_2O$ | 27.5 |
| CaO | 10 |

| Ingredients | Mole Percent |
|---|---|
| $Nd_2O_3$ | 0.5 |
| $CeO_2$ | 0.16 |

5. A method as defined in claim 1 in which the buffered gas mixture comprises about 91 to 94 percent by volume of $CO_2$ and about 6 to 9 percent by volume of CO, and the laser glass composition comprises the following ingredients in approximate mole percentages:

| Ingredients | Approximate Mole Percent |
|---|---|
| $SiO_2$ | 49 – 62 |
| $Li_2O$ | 25 – 30 |
| CaO | 8 – 22 |

6. A method as defined in claim 1 in which the glass laser composition comprises the following composition:

| COMPONENT | WEIGHT PERCENT |
|---|---|
| $SiO_2$ | At least 45 up to 80 |
| $Al_2O_3$ | Greater than 4 up to 40 |
| $Li_2O$ | Greater than 5.5 up to 20 |
| $Nd_2O_3$ | At least about 1 up to 8 |

7. A method as defined in claim 1, in which the glass laser composition comprises the following composition:

| COMPONENT | WEIGHT PERCENT |
|---|---|
| $SiO_2$ | 45–80 |
| $Al_2O_3$ | 4.6–36 |
| $Li_2O$ | 5.6–18 |
| $Nd_2O_3$ | 1–4 |

8. A method as defined in claim 1 in which the buffered gas mixture comprises $CO_2$ and $NH_3$, and the glass laser composition comprises the following composition:

| Component | Weight Percent |
|---|---|
| $SiO_2$ | 77.16 |
| $Al_2O_3$ | 4.68 |
| $Li_2O$ | 15.07 |
| $Nd_2O_3$ | 3.09 |

9. A method as defined in claim 1 in which the buffered gas mixture is $CO_2/CO$.

10. A method as defined in claim 1 in which the partial pressure of oxygen is greater than about $10^{-13}$ atmospheres at a temperature of 2,600°F.

11. A method as defined in claim 1 in which the partial pressure of oxygen is greater than about $10^{-14}$ at a temperature of about 2,421°F.

12. A method of melting glass laser compositions with a minimum of platinum inclusions and a minimum of dissolved platinum content in the resultant glass laser material, the process comprising melting the laser glass composition in a container having at least 50 percent by weight of platinum in a reducing atmosphere with a buffered gas mixture, the atmosphere having a minimum level of the partial pressure or oxygen that is equivalent to a range of about $10^{-8.6}$ to $10^{-38}$ atmospheres for a temperature range of about 981°F. to 3,321°F. for a silicate glass; the partial pressure of oxygen of $10^{-38}$ atmospheres being a minimum at the low temperature of about 981°F. and the partial pressure of $10^{-8.6}$ being a minimum at the high temperature of about 3,321°F., the minimum level of the partial pressure of oxygen, expressed as $\log_{10} P_{O_2}$ at the temperature used to melt the glass, being set forth below:

| T. °F. | $\log_{10} P_{O_2}$ |
|---|---|
| 981 | −38 |
| 1701 | −22 |
| 1881 | −20 |
| 2061 | −18 |
| 2241 | −16 |
| 2421 | −14 |
| 2601 | −13 |
| 2781 | −12 |
| 2961 | −11 |
| 3141 | −10 |
| 3321 | − 8.6 | where the minimum levels of $\log_{10} P_{O_2}$ are determined according to the following equation:

$$\Delta F = \Delta F_f^\circ + RT \ln [A_{SiO_2}^{glass}/(A_{Si})^{Pt} (P_{O_2})] = 0$$

in which $\Delta F$ is the change in free energy; $\Delta F_f^\circ$ is the standard state Gibbs free energy of formation of $SiO_2$ which is −145,600 cal/mole at 2,600°F.; R is the universal gas constant equal to about 1.98717 cal/mole degree; T is the temperature at which the glass is melted in degrees Kelvin which is 1,700 at 2,600°F.; $A_{SiO_2}^{glass}$ is 0.15; $A_{Si}^{Pt}$ is $10^{-5}$; and $P_{O_2}$ is the partial pressure of oxygen.

13. A method as defined in claim 12, in which the glass laser composition comprises the following approximate composition:

| COMPONENT | WEIGHT PERCENT |
|---|---|
| $SiO_2$ | At least 45 up to 80 |
| $Al_2O_3$ | Greater than 4 up to 40 |
| $Li_2O$ | Greater than 5.5 up to 20 |
| $Nd_2O_3$ | At least about 1 up to 8 |

14. In a method of melting a glass laser composition with a minimum of platinum inclusions and a minimum of dissolved platinum content, in which the glass laser composition is melted in a platinum container having at least 50 percent by weight of platinum, the improvement comprising melting laser glass in a reducing atmosphere with a buffered gas mixture of the group consisting of $CO_2/NH_3$, $CO_2/H_2O$, $H_2O/H_2$, $H_2O/NH_3$ and $CO_2/CO$, and maintaining and controlling the partial pressure of oxygen at a minimum level which is in a range that is substantially equivalent to a range of about $10^{-8.6}$ to $10^{-38}$ atmospheres for a range of temperatures from about 981° to 3,321°F. for a silicate, the partial pressure of oxygen of $10^{-38}$ atmospheres being the minimum level at the low temperature of about 981°F. and the partial pressure of $10^{-8.6}$ being the minimum level at the high temperature of 3,321°F., the minimum level of the partial pressure of oxygen, expressed as $\log_{10} P_{O_2}$ at the temperature used to melt the glass being set forth below:

| T. °F. | $\log_{10} P_{O_2}$ |
|---|---|
| 981 | −38 |
| 1701 | −22 |
| 1881 | −20 |
| 2061 | −18 |
| 2241 | −16 |
| 2421 | −14 |
| 2601 | −13 |
| 2781 | −12 |
| 2961 | −11 |
| 3141 | −10 |
| 3321 | − 8.6 | where the minimum levels of $\log_{10} P_{O_2}$ are determined according to the following equation:

$$\Delta F = \Delta F_f^\circ + RT \, [A_{SiO_2}^{glass}/(A_{Si})^{Pt} \, (P_{O_2})] = 0$$

in which $\Delta F$ is the change in free energy; $\Delta F_f^\circ$ is the standard state Gibbs free energy of formation of $SiO_2$ which is −145,600 cal/mole at 2,600°F.; R is the universal gas constant equal to about 1.98717 cal/mole degree; T is the temperature at which the glass is melted in degrees Kelvin which is 1,700 at 2,600°F.; $A_{SiO_2}^{glass}$ is 0.15; $A_{Si}^{Pt}$ is $10^{-5}$; and $P_{O_2}$ is the partial pressure of oxygen.

15. A method as defined in claim 12 in which the buffered gas mixture is $CO_2/CO$.

16. A method as defined in claim 12 in which the buffered gas mixture is $CO_2/NH_3$.

17. A method as defined in claim 12 in which the buffered gas mixture is $H_2O/H_2$.

18. A method of melting silicate glass laser compositions with a minimum of platinum inclusions and a minimum of dissolved platinum content in the resultant glass laser material, the process comprising melting laser glass compositions in a platinum metal container with a buffered gas mixture of the group consisting of $CO_2/NH_3$, $CO_2/H_2$, $H_2O/H_2$, $H_2O/NH_3$ and $CO_2/CO$ in a reducing atmosphere in which the partial pressure of oxygen is no greater than about $10^{-3}$ atmospheres, the partial pressure of oxygen being controlled and maintained at a partial pressure that is substantially equivalent to a range of about $10^{-8.6}$ to $10^{-38}$ for a temperature range of about 981°F. to 3,321°F. for a silicate glass, the partial pressure of oxygen of $10^{-38}$ atmospheres being a minimum at the low temperature range of about 981°F. and the partial pressure of $10^{-8.6}$ being a minimum at the high temperature of about 3,321°F., the minimum level of the partial pressure of oxygen, expressed as $\log_{10} P_{O_2}$ at the temperature used to melt the glass being set forth below:

| T. °F. | $\log_{10} P_{O_2}$ |
|---|---|
| 981 | −38 |
| 1701 | −22 |
| 1881 | −20 |
| 2061 | −18 |
| 2241 | −16 |
| 2421 | −14 |
| 2601 | −13 |
| 2781 | −12 |
| 2961 | −11 |
| 3141 | −10 |
| 3321 | − 8.6 |

19. A method as defined in claim 18 in which the partial pressure of oxygen is about $10^{-8}$ to $10^{-12}$ at 2,600°F.

20. A method as defined in claim 12 in which the laser glass composition comprises the following ingredients in approximate mole percentages:

| INGREDIENTS | PERCENT |
|---|---|
| $SiO_2$ | 45 to 75 |
| $Li_2O$ | 15 to 35 |
| CaO | ½ to 30 |
| $Nd_2O_3$ | 1/10 to 2 |
| $Al_2O_3$ | 0 to 8 |

\* \* \* \* \*